United States Patent [19]
Ohta et al.

[11] Patent Number: 4,783,996
[45] Date of Patent: Nov. 15, 1988

[54] DIRECT-HEATED FLOW MEASURING APPARATUS

[75] Inventors: Minoru Ohta, Okazaki; Kazuhiko Miura, Aichi; Michitoshi Onoda, Toyohashi; Yukio Iwasaki, Gifu; Tadashi Hattori, Okazaki, all of Japan

[73] Assignee: Nippon Soken, Inc., Nishio, Japan

[21] Appl. No.: 824,265

[22] Filed: Jan. 30, 1986

[30] Foreign Application Priority Data

Feb. 2, 1985 [JP] Japan .................................. 60-17710

[51] Int. Cl.$^4$ .............................................. G01F 1/68
[52] U.S. Cl. .............................. 73/204.17; 73/204.21; 73/204.26
[58] Field of Search ........................... 73/204; 357/55

[56] References Cited

U.S. PATENT DOCUMENTS

| | | | |
|---|---|---|---|
| 3,359,462 | 12/1967 | Schutze et al. | 357/55 X |
| 4,320,655 | 3/1982 | Kammermaier et al. | 73/204 |
| 4,498,337 | 2/1985 | Gruner | 73/204 |
| 4,501,144 | 2/1985 | Higashi et al. | 73/204 |
| 4,542,650 | 9/1985 | Renkin et al. | 73/204 |
| 4,554,829 | 11/1985 | Sumal | 73/204 |
| 4,594,889 | 6/1986 | McCarthy | 73/204 |

Primary Examiner—Herbert Goldstein
Attorney, Agent, or Firm—Cushman, Darby & Cushman

[57] ABSTRACT

A direct-heated flow measuring apparatus including a substrate, a film resistor for generating heat and sensing its temperature, and a feedback control circuit for controlling the heat generated by the film resistor so that the temperature of the film resistor is a predetermined value. Also, provided in the substrate is an aperture or the like for throttling the heat transfer of the film resistor. Further, a reinforced structure is formed on the part of substrate where the aperture or the like is formed.

7 Claims, 6 Drawing Sheets

DIRECT-HEATED FLOW MEASURING APPARATUS

BACKGROUND OF THE INVENTION (1) Field of the Invention

The present invention relates to a direct-heated flow measuring apparatus having a film resistor which serves as a temperature detecting means, as well as an electric heater. Such a direct-heated flow measuring apparatus can be used, for example, for measuring the flow rate of engine intake air.

(2) Description of the Related Art

Generally, in an internal combustion engine, the amount of intake air is one of the most important parameters for controlling the fuel injection amount, ignition timing, and the like. A gas-flow measuring apparatus, i.e., an airflow meter, is provided for measuring the same. One of the more common prior art airflow meters is the vane-type, which is, however, disadvantageous in scale, response speed characteristics, and the like. Recently, airflow meters having temperature-dependent resistors have been developed, which are advantageous in scale, response speed characteristics, and the like.

There are two types of airflow meters having temperature-dependent resistors, i.e., the heater-type and direct-heated type. The heater-type airflow meter may consist of an electric heater resistor provided in an intake-air passage of an engine and two temperature-dependent resistors arranged on the upstream and downstream sides of the electric heater resistor. In this case, the temperature-dependent resistor on the downstream side is used for detecting the temperature of air heated by the heater resistor, while the temperature-dependent resistor on the upstream side is used for detecting the temperature of non-heated air. The current flowing through the heater resistor is controlled maintain a constant difference in temperature between the two temperature-dependent resistors, then, by detecting the voltage applied to the heater resistor, the mass flow rate of air can be calculated.

In this heater-type airflow meter, if no upstream temperature-dependent resistor is provided and the current of the heater resistor is controlled for a constant temperature of the downstream temperaturedependent resistor, the voltage applied to the heater resistor can be detected to determine the volume flow rate of air.

On the other hand, the direct-heated type airflow meter may consist of a film resistor which serves not only as an electric heater, but also as a temperature-detecting means for detecting the temperature of the heated air. Also, the direct-heated type airflow meter may consist of a temperature-dependent resistor for detecting the temperature of non-heated air. Thus, the current flowing through the film resistor is controlled for a constant difference in temperature between the film resistor and the temperature dependent resistor, thereby detecting the voltage applied to the film resistor as the mass flow rate of air. In this direct-heated type airflow meter, too, if no temperature-dependent resistor is provided and the current of the heater resistor is controlled for a constant temperature of the film resistor, the voltage applied to the film resistor is detected as the volume flow rate of air.

Since the film resistor of the direct-heated type airflow meter serves as a temperature-detecting means for heated air, that is, no additional temperature detecting means for heated air is necessary, the direct-heated type airflow meter is smaller in size than the heater-type airflow meter.

In the direct-heated type airflow meter, the film resistor may consist of an insulating substrate such as a ceramic substrate or monocrystalline silicon substrate, a resistance pattern of platinum (Pt), gold (Au), etc. on the insulating substrate, and a heat-resistant resin on the resistance pattern.

Usually, the response characteristics and dynamic range of the direct-heated type airflow meter are dependent upon the heat mass and adiabatic efficiency of the resistance pattern, which serves not only as a heating means but also as a temperature detecting means. In order to obtain the most excellent response characteristics and largest dynamic range, the resistance pattern should be ideally in a completely floating state in the air stream.

For this purpose, there may be suggested a direct-heated type airflow meter in which a section is cut away (below, "aperture") between the heating and temperature detecting portion of the substrate, including the film resistor, and the supporting portion of the substrate. This "throttles" the heat transfer and thus increases the adiabatic efficiency of the heating and temperature detecting portion and improves the response speed and dynamic range of the airflow meter.

As explained above, however, when throttling of heat transfer is carried out by providing an aperture between the heating and temperature detecting portion of the substrate and the supporting portion thereof, the mechanical strength of the heat transfer throttling portion of the substrate is very small, thereby weakening the airflow meter.

SUMMARY OF THE INVENTION

It is an object of the present invention to provide a strong direct-heated flow measuring apparatus and manufacturing method for the same.

According to the present invention, there is provided a direct-heated flow measuring apparatus including a substrate, a film resistor for generating heat and sensing its temperature, and a feedback control circuit for controlling the heat generated by the film resistor so that the temperature of the film resistor is a predetermined value. Also, provided in the substrate is an aperture or the like for throttling the heat transfer of the film resistor. Further, a reinforced structure is formed on the part of substrate where the aperture or the like is formed. Such a reinforced structure has a minimal effect on the adiabatic effect, yet increases the mechanical strength of the heat transfer throttling portion.

BRIEF DESCRIPTION OF THE DRAWINGS

The present invention will be more clearly understood from the description as set forth below with reference to the accompanying drawings, wherein:

FIGS. 7A through 7G are cross-sectional views for explaining the manufacturing steps of the substrate of FIGS. 4A through 4D.

DESCRIPTION OF THE PREFERRED EMBODIMENTS

Figure 1:
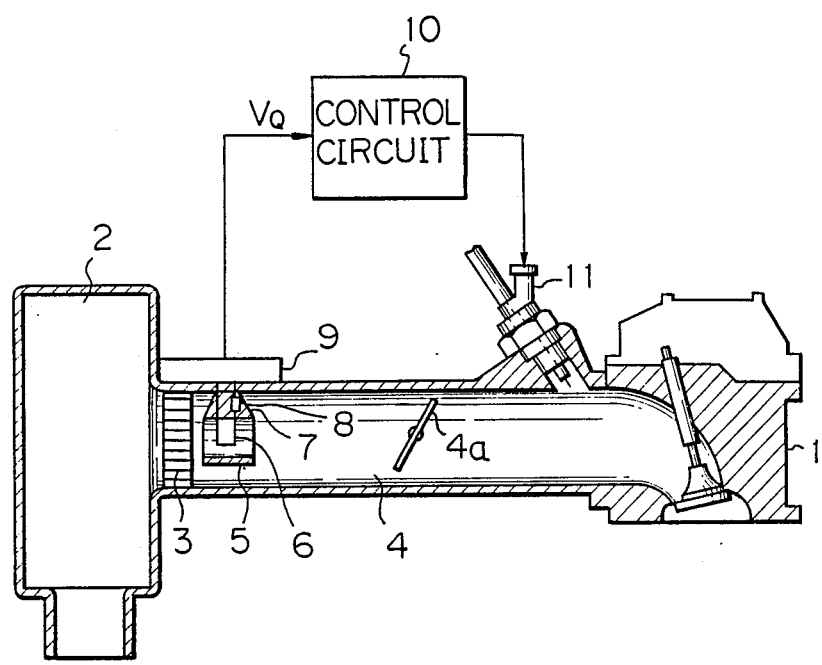
FIG. 1 is a schematic diagram showing the overall configuration of an internal combustion engine including a direct-heated type flow measuring apparatus according to the present invention.
Figure 2:
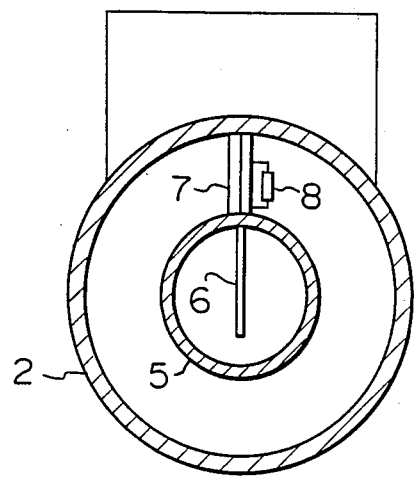
FIGS. 2 and 3 are longitudinal and traverse cross-sectional views, respectively, of the flow measuring apparatus of FIG. 1.
Figure 3:
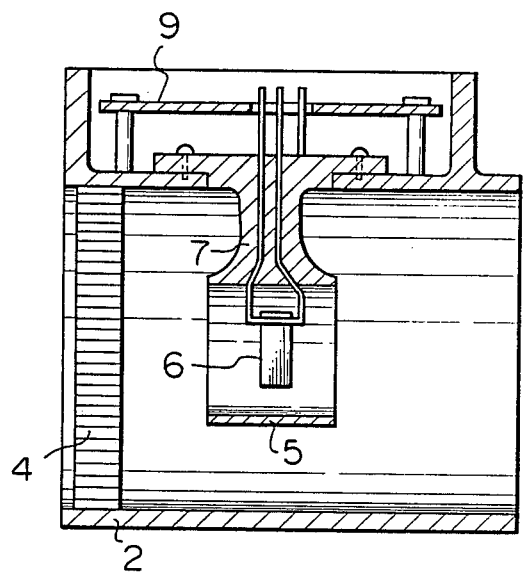

In FIGS. 1 2, and 3, which illustrate the overall configuration of an internal engine including a flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 4a arbitrarily operated by a driver. The flow measuring apparatus is provided in the intake air passage 4 between the rectifier grid 3 and the throttle valve 4a.

The flow measuring apparatus includes a sensing portion inside of the intake air passage 4 and a sensing circuit 9 outside of the intake air passage 4. The sensing portion includes a measuring tube (or duct) 5 fixed by a stay 7 to the intake air passage 4. A film resistor 4 is provided inside of the duct 5, while a temperature-dependent resistor 8 for detecting the temperature of non-heated air is provided outside of the duct 5. The film resistor 6 and the temperature-dependent resistor 8 are connected to the sensing circuit 9 encapsulated in a hybrid board. Note that the temperature-dependent resistor 8 can be disposed within the duct 5, under the condition that the resistor 8 is not substantially affected by the heat generated from the film resistor 6. The sensing circuit 9 controls the current flowing to the film resistor 6 to generate heat for a constant difference in temperature between the film resistor 6 and the temperature-dependent resistor 8. Also, the sensing circuit 9 generates an output voltage $V_Q$ and transmits it to a control circuit 10, which includes, for example, a microcomputer. The control circuit 10 also receives various kinds of detecting signals such as an engine speed signal Ne (not shown) and an engine coolant temperature signal THW (not shown) and controls the valve opening time period of a fuel injection valve 11 and the like.

Figure 4A:
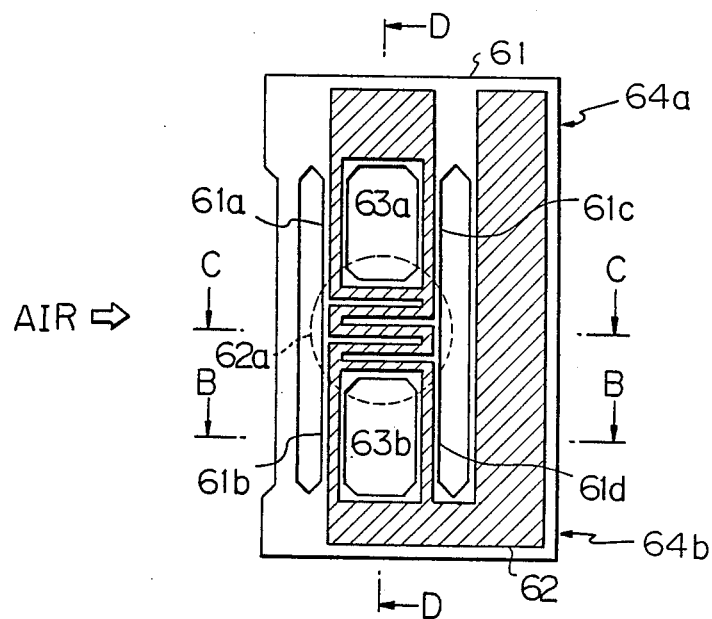
FIG. 4A is a plan view illustrating an example of the film resistor according to the present invention.
Figure 4B:
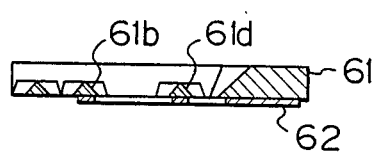
FIGS. 4B, 4C, and 4D are cross-sectional views taken along the line B—B, C—C, and D—D, respectively, of FIG. 4A.

FIG. 4A shows an example of the film resistor 6 of FIG. 1, and FIGS. 4B, 4C, and 4D are cross-sectional views taken along the lines B—B, C—C, and D—D, respectively, of FIG. 4A. As shown in FIG. 4A, an insulating layer such as $SiO_2$ (not shown) is evaporated on and etched on a monocrystalline silicon substrate 61 having a thickness of about 200 to 400 μm, thereby obtaining a temperature-dependent resistor 62. The portion 62a of the resistor 62 indicated by a dotted frame serves as a heating and temperature-detecting portion.

Figure 4D:
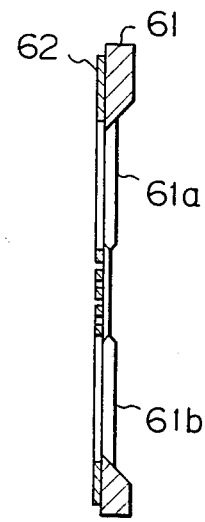
Figure 4C:
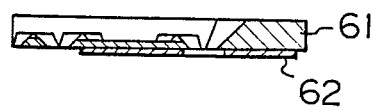

Formed on the sides of the heating and temperature-detecting portion 62a are apertures 63a and 63b, which throttle heat transfer upon the heating and temperature-detecting portion 62a and thus increase the adiabatic effect. Further, the silicon substrate 61 on the heating and temperature-detecting portion 62a is very thin as shown in FIGS. 4C and 4D, thereby decreasing the heat mass thereof.

In the present invention, four bridge portions 61a, 61b, and 61c, and 61d of the substrate 61 linking the heating and temperature-dependent portion 62a to the supporting portion 64a or 64b of the substrate 61 have an effective thickness larger than the heating and temperature-detecting portion 62a, thereby reinforcing them. The bridge portions 61a, 61b, 61c, and 61d are of a rib structure, which can be obtained by anisotropic etching.

Figure 5A:
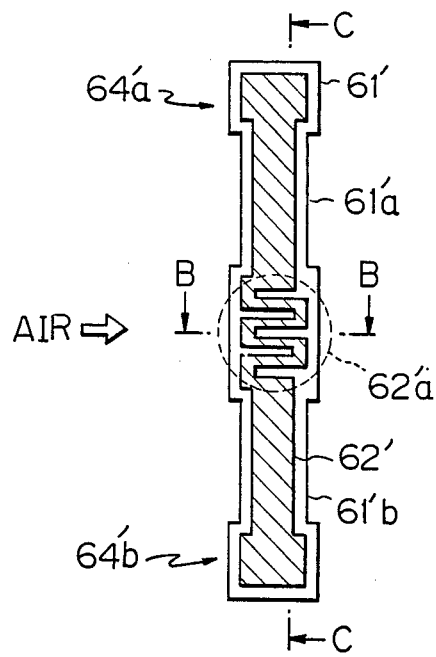
FIG. 5A is an plan view illustrating another example of the film resistor according to the present invention.
Figure 5C:
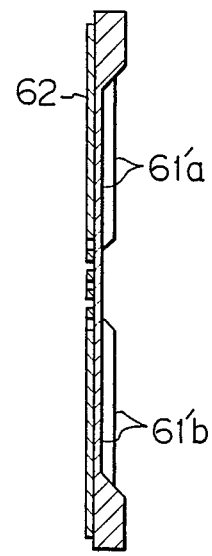
FIGS. 5B and 5C are cross-sectional views taken along the lines B—B and C—C, respectively of FIG. 5A.
Figure 5B:
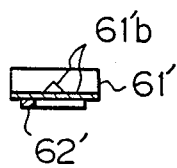

FIG. 5A shows another example of the film resistor 6 of FIG. 1, and FIGS. 5B and 5C are cross-sectional views taken along the lines B—B and C—C, respectively, of FIG. 5A. Also in FIGS. 5A to 5C, on a monocrystalline silicon substrate 61′, a temperature-dependent resistor pattern 62′ is formed by evaporation and etching, and the portion 62′a indicated by a dotted frame serves as a heating and temperature-detecting portion.

The substrate portions 61′a and 61′b on the sides of the heating and temperature detecting portion 62′a are narrower as compared with the portion 62′a so that throttling of the heat transfer is caused, thereby increasing the adiabatic effect of the heating and temperature-detecting portion 62′a. In the same way as in FIGS. 4A to 4D, the silicon substrate 61′ on the heating and temperature-detecting portion 62′a is very thin as shown in FIGS. 5B and 5C thereby decreasing the heat mass thereof. Further, similarly, two bridge portions 61′a and 61′b of the substrate 61′ linking the heating and temperature-dependent portion 62′a to the supporting portion 64′a or 64′b of the substrate 61′ have an effective thickness larger than the heating and temperature-detecting portion 62′a, thereby reinforcing them. The bridge portions 61′a and 61′b are also of a rib structure obtainable by anisotropic etching.

Figure 6:
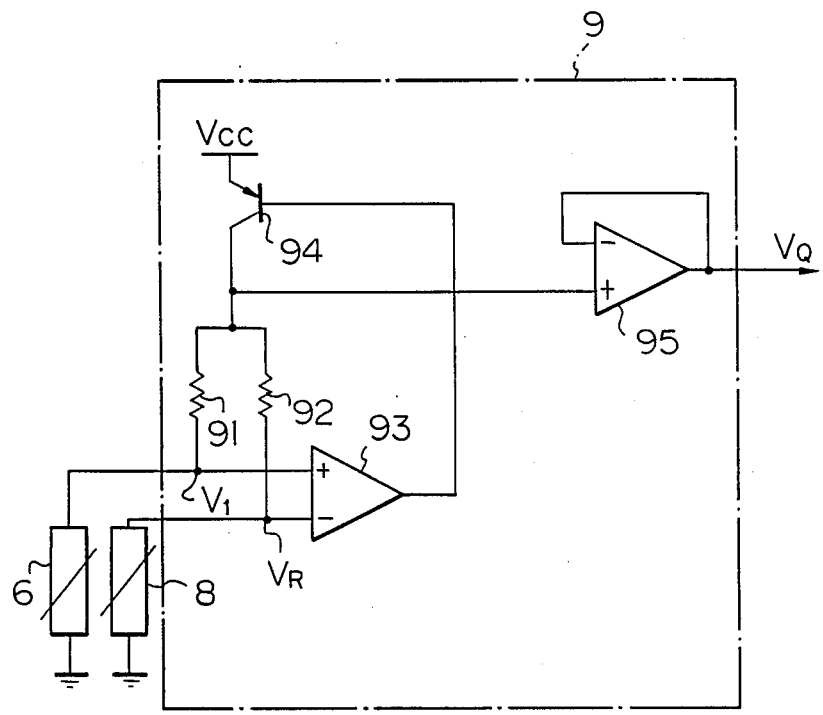
FIG. 6 is a circuit diagram of the sensing circuit of FIG. 1.

The sensing circuit 9 of FIG. 1 will be explained with reference to FIG. 6. In FIG. 6, the sensing circuit 10 includes resistors 91 and 92 which form a bridge circuit with the film resistor 6 and the temperature-dependent resistor 8; a comparator 93; a transistor 94 controlled by the comparator 93; and a voltage buffer 95. The sensing circuit 9 operates as follows. When the amount of air flowing through the intake air passage 4 increases, thus reducing the temperature of the film resistor 6, which, in this case, serves as a thermistor, the resistance value thereof decreases so as to satisfy the following condition:

$$V_1 < V_R$$

where $V_1$ is the potential at the node between the resistor 91 and the film resistor 6 and $V_R$ is the potential at the node between the resistor 92 and the temperature-dependent resistor 8. As a result, the output potential of the comparator 93 is reduced, thereby increasing the conductivity of the transistor 94. Therefore, the heat generated by the film resistor 6 is increased and, simultaneously, the collector potential of the transistor 94 is increased, so that the output voltage $V_Q$ of the voltage buffer 95 is also increased.

Contrary to this, when the amount of air flowing through the intake air passage 4 decreases, thus increasing the temperature of the film resistor 6, the resistance value thereof increases so as to satisfy the following condition:

$$V_1 > V_R.$$

As a result, the output potential of the comparator 93 is increased, thereby decreasing the conductivity of the transistor 94. Therefore, the heat generated by the film resistor 6 is decreased and, simultaneously, the collector potential of the transistor 94 is decreased, so that the output voltage $V_Q$ of the voltage buffer 95 is also decreased.

Thus, feedback control is performed upon the temperature of the film resistor 6 for a constant difference in temperature between the film resistor 6 and the temperature-dependent resistor 8, which, in this case, detects the temperature of ambient air. Thus, the output voltage $V_Q$ of the output buffer 95 indicates the amount of air flowing through the intake air passage 4.

Next, the manufacturing steps of the substrate 61 of FIGS. 4A to 4D will be explained with reference to FIGS. 7A through 7G. Note that each of FIGS. 7A through 7G correspond to the cross-sectional view of FIG. 4B.

Figure 7A:
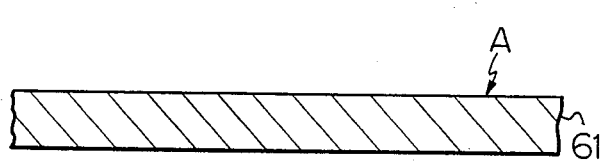
Figure 7B:
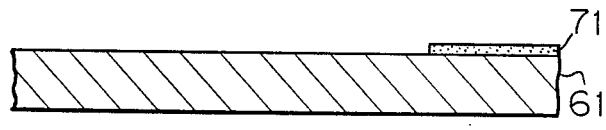
Figure 7C:

First, a monocrystalline silicon substrate 61 as shown in FIG. 7A is prepared. Note that a resistance pattern 62 (not shown) is already deposited on the back of the silicon substrate 61. In this case, the face of the silicon 61 as indicated by arrow A is the face (100) or (110). Next, as shown in FIG. 7(B), in order to form its supporting portion, an etching passivation film 71 such as $SiO_2$ or $Si_3N_4$ is formed, and anisotropic etching is performed upon the film 71, thereby obtaining the shape as shown in FIG. 7C. Here, the face indicated by arrow B is (111). That is, the anisotropic etching uses a difference in etching speed: the etching speed of the (111) face of monocrystalline silicon is very small as compared with that of the (100) or (110) face thereof.

Figure 7D:
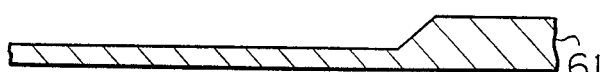
Figure 7E:
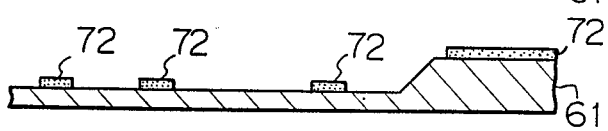
Figure 7G:
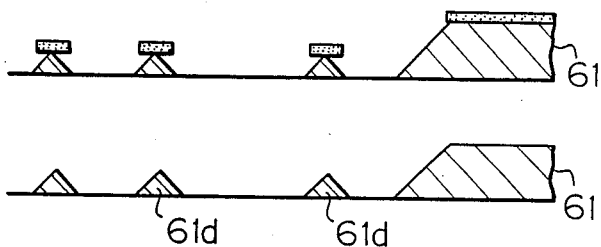

Next, as shown in FIG. 7D, the etching passivation film 71 is removed, and, as shown in FIG. 7E, another etching passivation film 72 is formed. Then, another anisotropic etching is carried out to obtain a shape as shown in FIG. 7F. Then, the etching passivation film 72 is removed, thus obtaining a final shape as shown in FIG. 7G. That is, the rib structures 61b and 61d (61a and 61c) are obtained.

The rib structures 61'a and 61'b as shown in FIGS. 5A to 5C are obtained in the same manufacturing steps.

Thus, in the embodiments of the present invention, use is made of anisotropic etching, thereby reinforcing the bridge portions, i.e., the heat transfer throttling portions between the heating and temperature-detecting portion 62a (62'a) and the supporting portions 64a and 64b (64'a and 64'b).

Note that, in the above-mentioned embodiments, although the temperature-dependent resistors used as the heating and temperature-detecting portion are formed via the insulating layer on the substrate, diffusion resistors can be formed within the substrate instead of the temperature-dependent resistors. Also, the present invention can be applied to flow rate sensors other than airflow rate sensors, such as liquid flow rate sensors.

The present invention can be also applied to a digital (pulse) type flow rate sensor controlled by a trigger pulse. That is, in this sensor when such a trigger pulse is given to initiate heating of a heater resistor. Then, the heating of the heater resistor continues until a constant difference in temperature between two temperature-dependent resistors is generated, or until the downstream temperature-dependent resistor reaches a constant value. In this case, the heating time period is detected as the mass flow rate of air or the volume flow rate of air. Such a trigger pulse control has an advantage in that the power dissipation is good. Note that such trigger pulse control is possible in a direct-heated rate sensor.

As explained above, according to the present invention, the mechanical strength of the heat transfer throttling portions is increased, thereby strengthening the flow rate sensors.

We claim:

1. A direct-heated flow measuring apparatus for measuring the flow rate within a passage comprising:
    a substrate of monocrystalline silicon disposed within said passage;
    film resistor means, formed at said substrate for generating heat and detecting the temperature thereof,
    a plurality of apertures being formed in said substrate around said film resistor means, for throttling heat transfer of said film resistor means;
    four triangular cross section bridges for reinforcing said substrate and said film resistor means, located on said substrate adjacent said apertures; and
    means, connected to said film resistor means, for controlling an amount of heat generated by said film resistor means.

2. An apparatus as set forth in claim 1, wherein said bridging means reinforced structure is a rib structure made by the anisotropic etching of said monocrystalline silicon.

3. An apparatus as set forth in claim 1, wherein said film resistor means comprises a diffusion resistor formed in said monocrystalline silicon.

4. An apparatus as set forth in claim 1, further comprising temperature-dependent resistor means for detecting the temperature of a non-heated fluid in the fluid stream, said temperature-dependent resistor means being substantially unaffected by the heat generated from said film resistor means, said controlling means controlling the heat generated by said film resistor means in accordance with the temperature of said temperature-dependent resistor means.

5. A direct-heated flow measuring apparatus for measuring a flow rate within a passage comprising:
    a substrate of monocyrstalline silicon disposed within said passage;
    a film resistor, formed at said substrate, for generating heat and detecting the temperature thereof;
    said substrate formed with two apertures;
    four triangular cross section reinforcing structures formed adjacent said apertures, for reinforcing said substrate and resistor;
    electric power control means, connected to said film resistor, for controlling the heat generated by said film resistor; and
    a temperature-dependent resistor for detecting the temperature of a non-heated fluid in the fluid stream, said temperature-dependent resistor being substantially unaffected by the heat generated from said film resistor, said electric power control means controlling the heat generated by said film resistor in accordance with the temperature of said temperaturedependent resistor.

6. An apparatus as in claim 5 wherein said four triangular cross section reinforcing structures are rib structures made by an anisotrophic etching of said monocrystalline silicon.

7. An apparatus as in claim 5 wherein said film resistor comprises a diffusion resistor formed in said monocrystalline silicon

* * * * *